US012593025B2

(12) United States Patent
Jeromin

(10) Patent No.: US 12,593,025 B2
(45) Date of Patent: Mar. 31, 2026

(54) SYSTEMS AND METHODS OF REFRESHMENTS SPECIAL EFFECTS

(71) Applicant: Universal City Studios LLC, Universal City, CA (US)

(72) Inventor: Aaron Chandler Jeromin, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/954,180

(22) Filed: Nov. 20, 2024

(65) Prior Publication Data

US 2025/0168321 A1     May 22, 2025

Related U.S. Application Data

(60) Provisional application No. 63/601,556, filed on Nov. 21, 2023.

(51) Int. Cl.
| | |
|---|---|
| *H04N 13/398* | (2018.01) |
| *A47G 19/22* | (2006.01) |
| *B67D 1/08* | (2006.01) |
| *H04N 13/305* | (2018.01) |
| *H04N 13/349* | (2018.01) |
| *H04N 13/366* | (2018.01) |

(52) U.S. Cl.
CPC ....... *H04N 13/398* (2018.05); *A47G 19/2227* (2013.01); *B67D 1/0872* (2013.01); *H04N 13/305* (2018.05); *H04N 13/349* (2018.05); *H04N 13/366* (2018.05); *A47G 2019/2238* (2013.01)

(58) Field of Classification Search
CPC .. H04N 13/398; H04N 13/305; H04N 13/349; H04N 13/366; A47G 19/2227; A47G 2019/2238; B67D 1/0872
USPC .......................................................... 348/51
See application file for complete search history.

(56) References Cited

U.S. PATENT DOCUMENTS

| | | |
|---|---|---|
| 5,528,425 A | 6/1996 | Beaver |
| 6,817,716 B1 | 11/2004 | Hines |

(Continued)

OTHER PUBLICATIONS

PCT/US2024/056937 International Search Report and Written Opinion mailed Mar. 11, 2025.

(Continued)

*Primary Examiner* — Joseph G Ustaris
(74) *Attorney, Agent, or Firm* — Fletcher Yoder P.C.

(57) ABSTRACT

A refreshments special effects system includes a special effects system. The special effects system includes one or more displays used to project an image. The special effects system also includes a beam splitter positioned between the one or more displays, or a reflector, and a vessel, wherein the beam splitter receives the image from the display or the reflector. Where present, the reflector reflects the image back toward and through the beam splitter. The image passes through the beam splitter to generate an illusion on or around a vessel. The refreshments special effects system includes a control system with one or more sensors that monitor and provide sensor data related to the vessel within the viewing area. Further, the refreshments special effects system includes a processor configured to activate the special effects system based on the sensor data.

20 Claims, 7 Drawing Sheets

(56)                     References Cited

U.S. PATENT DOCUMENTS

| | | | | |
|---|---|---|---|---|
| 6,903,874 | B1 * | 6/2005 | Karterman | G09F 11/00 |
| | | | | 359/619 |
| 9,989,777 | B1 * | 6/2018 | Comploi | G03B 21/26 |
| 2010/0315491 | A1 * | 12/2010 | Carter | G03B 15/10 |
| | | | | 348/789 |
| 2021/0236952 | A1 | 8/2021 | Krauthamer | |
| 2023/0350623 | A1 | 11/2023 | Krauthamer et al. | |

OTHER PUBLICATIONS

Logan, Jacqueline; "First-Every Haunted Mansion Bar Coming to the Disney Treasure in 2024," Disney Parks Blog, Oct. 24, 2023, 10 pgs.

* cited by examiner

SYSTEMS AND METHODS OF REFRESHMENTS SPECIAL EFFECTS

CROSS-REFERENCE TO RELATED APPLICATION

This application claims priority from and the benefit of U.S. Provisional Application Ser. No. 63/601,556, entitled "SYSTEMS AND METHODS OF REFRESHMENTS SPECIAL EFFECTS", filed Nov. 21, 2023, which is hereby incorporated by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to the field of interactive and visual guest experiences. More specifically, embodiments of the present disclosure relate to systems and methods for generating special effects on or near food and beverage vessels.

Various amusement rides, exhibits, and demonstrations have been created to provide guests with unique interactive, motion, and visual experiences. Such experiences may be designed to provide enhancement to everyday activities to create a fantastical environment. In various rides and exhibits, guest experiences may be enhanced by employing certain interactive visual features within the rides and exhibits. However, some interactive visual features may be costly and ill-suited for incorporation into personalized interactions that guests may directly watch, touch, smell, and taste.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a refreshments special effects system includes a special effects system. The special effects system includes one or more displays configured to generate an image; and a beam splitter positioned between the one or more displays and a vessel, wherein the beam splitter is configured to receive the image to generate an illusion on or around a vessel, wherein the vessel is configured to hold a food or beverage item and wherein the vessel is at least partially transparent to visible light. The special effects system also includes a control system, wherein the control system comprises: one or more sensors configured to monitor a viewing area, wherein the sensor is configured to provide sensor data related to the vessel in the viewing area; and a processor configured to activate the special effects system based on the sensor data.

In an embodiment, a method of operating a refreshments special effects system is provided. The method includes receiving sensor data indicative of a presence of a vessel within a special effects system, wherein the vessel is configured to hold a food or beverage item and wherein the vessel is at least partially transparent to visible light. The method also includes tracking movement of a liquid into the vessel from an outlet of the special effects system and activating the special effects system to project an image responsive to receiving the sensor data and tracking the movement. The image is projected towards a beam splitter positioned between a reflector and the vessel. The beam splitter receives the image from the one or more displays and reflects the image toward the reflector to generate an illusion on or around a vessel.

In an embodiment, a refreshments special effects system is provided that includes a vessel that is at least partially transparent to visible light and holds a food or beverage item. The refreshments special effects system also includes a special effects system including one or more displays used to generate a three-dimensional illusion on or around a vessel. The vessel is positioned between a viewing area of the three-dimensional illusion and the one or more displays. Further, the refreshments special effects system includes a control system. The control system includes one or more sensors used to sense one or both of a presence or position of the vessel relative to the one or more displays and generate sensor data. The control system further includes a processor used to activate the special effects system based on the sensor data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
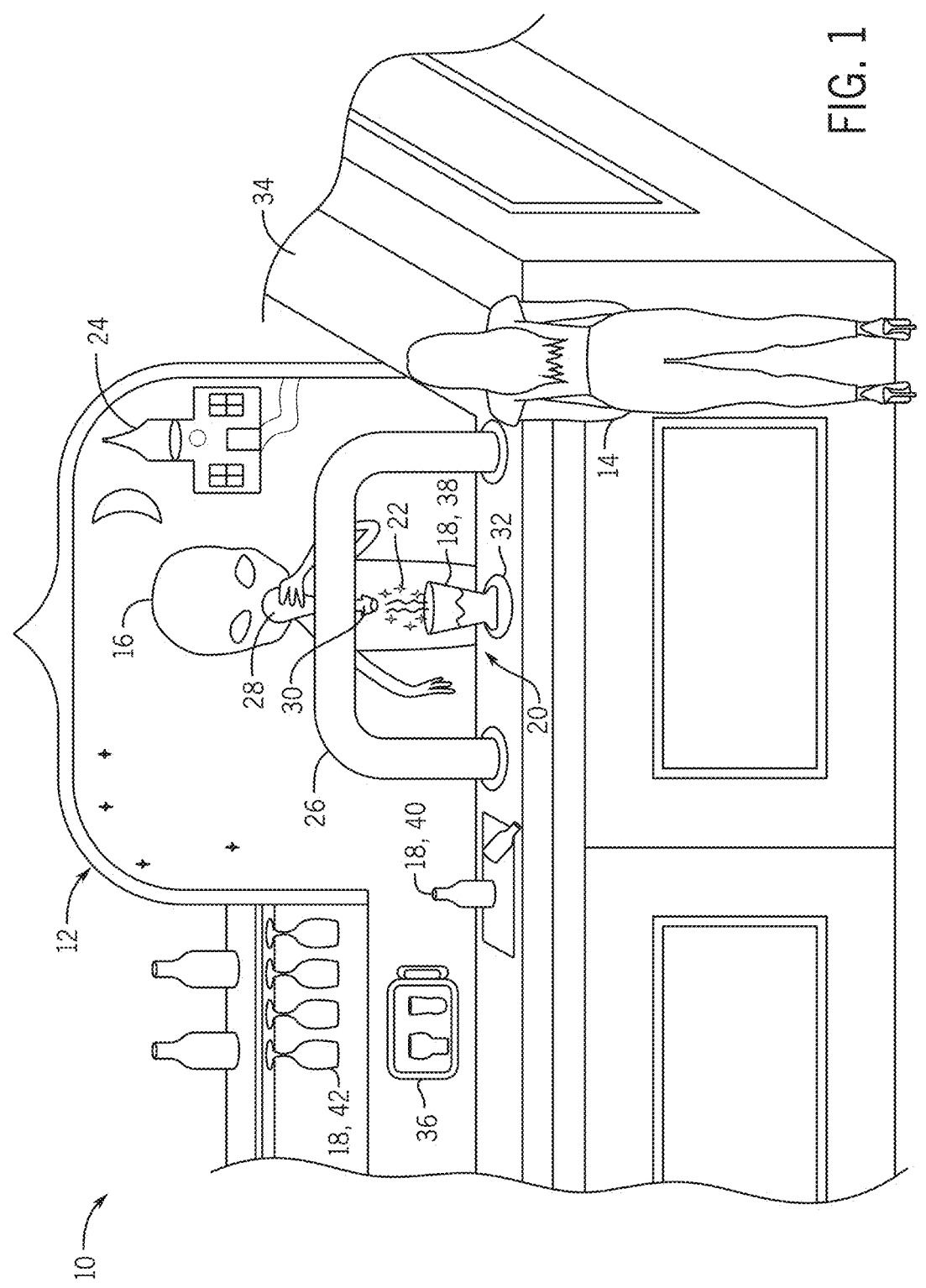
FIG. 1 is a schematic illustration of a food and beverage venue that includes a refreshments special effects system, in accordance with embodiments described herein.

One or more specific embodiments will be described below. In an effort to provide a concise description of these embodiments, not all features of an actual implementation are described in the specification. It should be appreciated that, in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that food and beverage venues in amusement parks may lack interactive components that may provide guests with enjoyment. For example, food and beverage venues may provide guests with themed libations (e.g., beverages, drinks, alcoholic beverages) that are pre-made or prepared before serving. However, certain types of food and beverage effects may be more immersive if the effect is part of a cooking or mixing experience (e.g., potions, secret recipes, magic spells). Inclusion of effects as part of a food and beverage preparation experience may be challenging. For example, incorporating displayed or projected media onto clear food and beverage vessels such as glassware is challenging. Clear vessels may be challenging to detect and/or track in space using convention sensors. In addition, these vessels may make poor surfaces for direct projection to create realistic illusions. Further, placing a transparent display in front of the vessel does not allow for effects to be placed inside of or behind the vessel, which may reduce the range of available illusions. Traditional Pepper's Ghost effects include a reflective surface that is placed at an angle to reflect media or a practical illuminated effect, causing an apparently floating image behind a reflective surface. This may result in a flat two dimensional floating image when paired with a traditional display, and may not convey a realistic result or the appearance of a volumetric three dimensional effect within or around a vessel.

Provided herein is a refreshments special effects system that facilitates generating visual illusions on or around food and beverage containers, e.g., clear glassware or vessels. The refreshments special effects system may create visual effects (e.g., Pepper's Ghost effect, projections) to enhance guest experiences, create enjoyment, or enhance a narrative part of an immersive environment. In this manner, amusement parks or other narrative experiences may be expanded to include visual experiences relating to ordering, purchasing and/or receiving themed refreshments. For example, the refreshments special effects system may be capable of enabling viewable preparation of refreshments (e.g., food and/or beverage) in front of guests to provide the system information to produce visual effects for guest enjoyment. As such, visual and audio effects are overlaid on or near objects (e.g., glasses, plates, spinning skewers of meat, dessert cups, food displays, refrigerated glass front units, food items) to generate realistic portrayal of special effects (e.g., media, audio, and/or auxiliary effects) on or near objects viewable by the guests. In one example, a special effect may include or enhance dynamic elements, such as pouring of liquids into the object. In an embodiment, the refreshments special effects system may incorporate shaped or volumetric displays in conjunction with a Pepper's Ghost effect to more realistically display three-dimensional effects on or near refreshment vessels.

FIG. 1 is a schematic illustration of an environment 10 entertainment venue. It should be understood that the environment 10 is by way of example, and other contexts for use in conjunction with the refreshments special effects system are also contemplated. The environment 10 may be part of an amusement park or other narrative experience that facilitates guest interaction through the inclusion of visual experiences. The environment 10 may be any restaurant, bar, or other food and beverage venue. The environment 10 may be part of a retail experience, an attraction experience, an educational experience, a tourism experience, etc. The environment 10 includes one or more refreshments special effects systems 12 that may be used to generate a refreshments (e.g., food and/or beverage) effect.

In the illustrated example, an observer 14 (e.g., a guest) may order, purchase, or receive refreshments from a staff member 16. As such, the staff member 16 may prepare a refreshment (e.g., using a vessel 18 as an empty or available beverage and/or food container) in conjunction with the refreshments special effects system 12. The refreshments special effects system 12 may identify a presence of the vessel 18 (e.g., transparent object, glass) in a viewing area 20 (e.g., area observable by guests) and transmit a signal to a special effect system to generate special effects 22 (e.g., one or more special effects, one or more illusions, visual effect, imagery projection, Pepper's Ghost effect) on or near the vessel 18. Additionally, the refreshments special effects system 12 may activate one or more additional special effects 24 (e.g., one or more additional illusions, projections, audio effects, light effects) surrounding the vessel 18 (e.g., next to the vessel 18, behind the vessel 18). The special effects 22 and/or the additional special effects 24 may enhance the immersive experience of the observer 14 within the environment 10 of the food and beverage venue.

With the foregoing in mind, in some embodiments, the refreshments special effects system 12 may include one or more elements as discussed with reference to FIG. 1, such as a special effects housing 26 (e.g., a stand), a tap handle 28, an outlet 30 (e.g., spout, dispenser), a base 32, light sources (e.g., one or more light sources), speakers (e.g., one or more speakers), microphones (e.g., one or more microphones), projectors (e.g., one or more projectors), displays (e.g., one or more displays), and sensors (e.g., one or more sensors) used to detect the vessel 18 and activate the special effects system. The special effects housing 26 may be positioned on a surface 34 (e.g., bar, table, cart, stand) and may be positioned in proximity to a point of sale terminal 36. For example, the observer 14 may order the refreshment from the staff member 16 at the point of sale terminal 36. The staff member may select the vessel 18 associated with the refreshment ordered by the observer 14. In this manner, the observer 14 may order refreshments associated with different cups or glasses 38, 40, 42 of the illustrated embodiment. It is to be noted, that the glasses 38, 40, 42 serve by way of example and additional or other beverage and/or food container shapes may be used with refreshments special effects system 12. Further, certain elements may be combined or excluded. For example, the special effects system 12 may not include the special effects housing 26 (e.g., the stand) and may be filled from the base 32. In addition, the environmental features, such as the light sources or audio elements, are by way of example, and additional or other theming components may be present.

In general operation, the staff member 16 may select the vessel 18 (illustrated as glass 38) associated with the refreshment ordered by the observer 14. The glass 38 may then be supported by the base 32 within the viewing area 20 of the refreshments special effects system 12. The refreshments special effects system 12 may activate the special effects system when the vessel 18 is detected on the base 32 and/or within the viewing area 20. The special effects system may generate the special effects 22 (e.g., overlaid media or hologram images that correspond to the appropriate shape of the glass 38). In some instances, it may be advantageous for the special effects 22 to be generated from above the vessel 18 to ensure the observer 14 has a clear view of the vessel 18 during demonstration of the special effects 22. In an embodiment, the special effects 22 may be generated in the special effects housing 26 and projected on or near the vessel 18 from above.

With the foregoing in mind, in some embodiments, generation of one or more illusions by the special effects system of the refreshments special effects system 12 may provide more immersive environment, because the staff member 16 may operate naturally, selecting a particular vessel that is appropriate for an ordered beverage, and positioning the selected object within the viewing area 20, shown here as including one or more tap handles 28. As such, the viewing area 20 may be free from obstructed views allowing the observer 14 to experience realistic special effects during pouring and/or mixing of the ordered beverage. Further, the special effects system 12 can generate instructions to activate the special effects 22 and/or the additional special effects 24 that may include the illusions on and/or near the vessel 18. In some cases, the refreshments special effects system 12 may generate illusions by displaying (e.g., projecting) images (e.g., dynamic images, videos) of various ingredients (e.g., ingredients of a potion) in the vessel 18 to create effects of mixing (e.g., stirring a potion). In one example, a fire image may be projected to provide an illusion that liquid inside the vessel 18 is burning. In another example, a liquid level of a beverage may be tracked based on an amount of liquid being poured into the vessel 18 from the outlet 30 of the special effects system and/or sensor data from the special effects system 12 indicative of a real-time change of a liquid level in the vessel 18. In this manner, the special effects 22 (e.g., illusions) generated on or near the vessel 18 may be dynamically changed to match the liquid level of the beverage creating dynamic illusions to enhance immersive experiences viewed by the observer 14.

Figure 2:
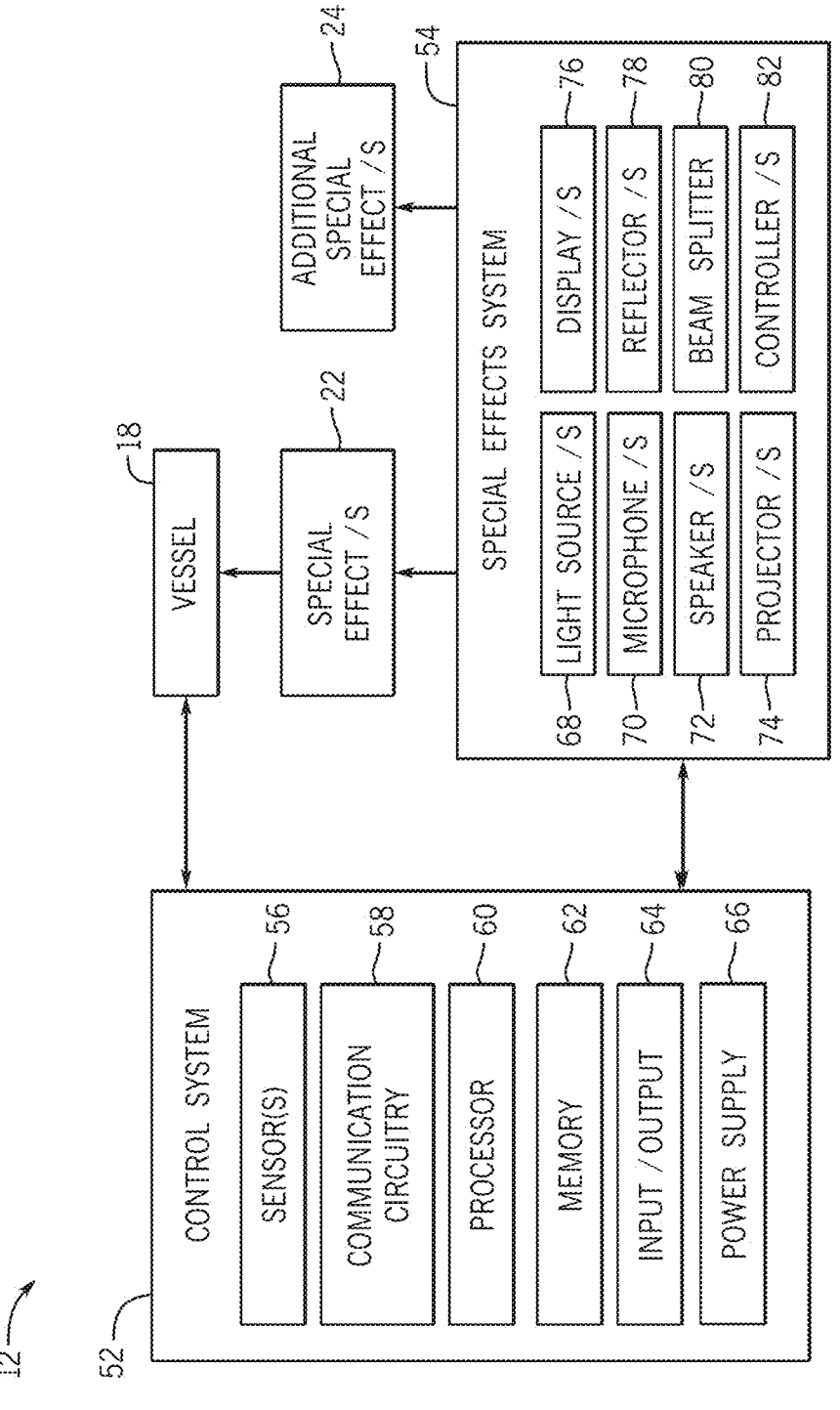
FIG. 2 is a block diagram of a refreshments special effects system, in accordance with embodiments described herein.

FIG. 2 is a block diagram discussed with reference to certain features of FIG. 1 and of the refreshments special effects system 12 that may be implemented to generate special effects 22 on or near vessels 18 in an environment of the present embodiment. The refreshments special effects system 12 includes a control system 52 and a special effects system 54. The control system 52 may include one or more sensor(s) 56, communication circuitry 58, a processor 60, a memory 62, an input/output (I/O) port 64, a power supply 66 (e.g., wired power, a battery) and the like. The control system 52 may receive sensor data from the sensor(s) 56 (e.g., position sensor, tracking sensor, cameras, lasers, infrared sensor, etc.) to activate the special effects system 54. The sensors may be separate from the control system 52 and may be communicatively coupled with the control system 52.

In some embodiments, the one or more sensors 56 of the control system 52 may be used to monitor the viewing area 20 (see FIG. 1) and detect a presence and/or a position of the vessel 18. As such, the sensors 56 may be used to sense the presence and/or the position of the vessel relative to the special effects housing 26 and generate sensor data. In some embodiments the one or more sensors 56 may include one or more cameras. The one or more cameras may include various cameras (e.g., thermal imager, complementary metal-oxide-semiconductor (CMOS) camera, charge-coupled device (CCD)), and may be positioned on or within the special effects housing 26. The sensors may also include photodiodes, photodetectors and/or other suitable detectors used to collect sensor data.

In certain embodiments, the sensors 56 may be directed towards areas (e.g., surface 34, bar, viewing area 20 of FIG. 1, etc.) associated with the vessel 18. The sensors 56 may detect the vessel 18 or surroundings (e.g., presence of guests, the viewing area 20, etc.) of the vessel 18 in order to generate sensor data. The sensor data may be indicative of the presence and/or an absence of the vessel 18 and sensor data may be provided to the processor 60 of the control system 52. The processor 60 may then transmit signals to the special effects system 54 to activate a special effect 22 based on the sensor data. For example, the sensor data (e.g., localization data, tracking data, identification data, object detection data) may provide information about the position of the vessel 18. In some cases, the vessel 18 may be in a static position. In this manner, the vessel 18 may be positioned in the static position substantially parallel to a source (e.g., projectors, displays, light sources, reflectors) of the special effects system 54. As such, the control system 52 may activate the special effects system 54 based on the position of the vessel 18 extracted from the sensor data. In other cases, the vessel 18 may be absent prompting the special effects system 54 to remain inactive.

The communication circuitry 58 may facilitate wired or wireless communication between various components of the control system 52 as well as with external devices, such as the point of sale terminal 36 (see FIG. 1), one or more radio frequency identification (RFID) tag(s) positioned on or near the vessel 18, or central or local controllers of the amusement park or immersive experience. The processor 60 may be any suitable type of computer processor or microprocessor capable of executing computer-executable code. Moreover, the processor 60 may include multiple microprocessors, one or more "general-purpose" microprocessors, one or more special-purpose microprocessors, and/or one or more application specific integrated circuits (ASICS), or some combination thereof. For example, the processor 60 may include one or more than one reduced instruction set (RISC) or complex instruction set (CISC) processors. In some embodiments, the processor 60 may receive inputs transmitted from the RFID tags positioned on the vessel 18 and communicate with the RFID tag using the communication circuitry 58. For example, the observer 14 may order refreshments associated with particular refreshment effects associated with the vessel 18. The vessel 18 may include the RFID tag and the base 32 (see FIG. 1) may include a RFID reader associated with the processor 60. As such, the control system 52 may receive a signal indicating that the vessel 18 is located on the base 32. In some instances, the control system 52 may control the special effect system 54 to activate the special effects 22 based on an identification of the vessel 18 made from the RFID tag.

The memory 62 of the control system 52 may also be used to store the data, various other software applications, and the like that are executed by the processor 60. The memory 62 may represent non-transitory computer-readable media (e.g., any suitable form of memory or storage) that may store the processor-executable code used by the processor 60 to perform various techniques described herein. The I/O ports 64 may be interfaces that may couple to other peripheral components such as input devices (e.g., keyboard, mouse), sensors, input/output (I/O) modules, and the like. The power supply 66 may provide power to one or more components of the control system 52. The components of the control system 52 and/or the special effects system 54 may be integrated within the food and restaurant venue including in the point of sale terminal 36, the special effects housing 26, the surface 34, or any other suitable component of the refreshments special effects system 12. As such, the control system 52 may be concealed at least in part from view of the observer 14.

The control system 52 of FIG. 2 may send the signal to activate the special effects system 54 to generate the special effects 22 on or near the vessel 18. As such, the special effects system 54 may include one or more light sources 68 (e.g., LEDs, LED strip, multiple LED strips, laser(s), etc.), one or more microphones 70, one or more speakers 72, and/or one or more projectors 74 that may be used to generate special effects 22 and/or additional special effects 24. The special effects system 54 may also include one or more displays 76, one or more reflectors 78, one or more beam splitters 80 and/or one or more controllers 82 used to generate special effects 22 including the illusion (e.g., the Pepper's Ghost effect) on/or near the surface of the vessel 18.

In certain embodiments, one of the controllers 82 of the special effects system 54 may include an audio and visual (A/V) controller. For example, the special effects system 54 may generate A/V effects under control of the controller 82 to provide themed sounds, background effects, projection or the like to enhance guest experiences. The controller 82 may control the light source 68, the microphones 70, the speakers 72, and/or one or more visual output devices (e.g., displays 76, projectors 74, etc.). For example, the controller 82 may control activation of audio recordings, and/or visual displays to enhance the special effects 22 produced by the special effects system 54. As such, the additional special effects 24 that may include audio recordings corresponding to the special effects 22 may be produced to enhance guest experiences in themed environments. In some instances, the controller 82 may activate a voice associated with a character of the themed environment from speakers 72 positioned near the vessel 18. In this manner, the additional special effects 24 surrounding the vessel 18 may appear to the observer 14 as resulting from casting of magical spells (e.g., projected from speaker). Further, likeness of the character may be projected in conjunction to the voice by the controller 82 of the special effects system 54. In this manner, the projector 74 may present various images at various times controlled by special effects system 54, such as to simulate certain movements in conjunction with the additional special effects 24. As such, the projector 74 may be an external projector, an optical projector with a lens, or the like.

In certain embodiments, the one or more displays 76 project an image towards the beam splitter 80 causing the beam splitter 80 to reflect the image towards the reflector 78 to generate the illusion (e.g., the special effects 22) on or near the vessel 18. The one or more displays 76 may include a lenticular display (e.g., lenticular volumetric display), a light field display, one or more two-dimensional (2-D) media displays (e.g., 2-D pixel display, light emitting diode (LED) display, organic light emitting diode (OLED) display), a persistence of vision display, one or more projectors, one or more three-dimensional displays, a transparent vision display (e.g., transparent liquid crystal display, see-through display), sparse LED displays, and the like. The displays 76 may not be visible to the observer 14 in the viewing area 20. As such, the displays 76 may be at least partially disposed within the special effects housing 26. It should be noted, that any suitable combination of the displays 76 may be used to generate the illusions that create volumetrically correct overlay of media on the vessels 18. Stated differently, combination of the displays 76 may be selected to produce the special effects 22 on or near the vessel 18 that can be viewed from multiple angles (e.g., 3-D illusion viewable from various angles by the observer 14). For example, images may be projected by the light field display and the sparse LED display on to a surface of the beam splitter 80 to generate realistic effects. Further, the light filed display may project images of slime on to the reflector 78. In some instances, the sparse LED display may project images of text (e.g., observer's name) simultaneously on to the reflector 78. In this manner, the reflector 78 may simultaneously transmit illusions of slime (e.g., appearing 3-D) within the vessel 18 and text (e.g., appearing 2-D) on the vessel 18 (e.g., appearing 2-D) to create realistic special effect 22 on and in the vessel 18.

In some embodiments, the beam splitter 80 used to reflect the image projected from the display 76 may be positioned between the vessel 18 and the displays 76. Further, the beam splitter 80 may intersect the reflector 78 and/or form an acute angle with the reflector 78. In this manner, the beam splitter 80 (e.g., optical beam splitter) may include a glass panel, a screen, a partially reflective film (e.g., plastic, foil, a semi-transparent mirror) or any suitable material with both transmissive and reflective properties. In this manner, the beam splitter 80 may enable reflection of the image and/or transmission of the image through the beam splitter 80 after reflection by the reflector 78. The reflector 78 may function as a proxy display 76 such that the reflector is along an axis with the beamsplitter 80 and the vessel 18, and the display 76 can be off-axis to permit flexibility in display positioning or hiding the display 76 from an observer. Reflection to and from the reflector 78 may result in image brightening. In some instances, the beam splitter 80 may directly reflect the image projected by the display 76 to generate the illusion without inclusion of the reflector 78.

In certain embodiments, the reflector 78 may include a mirror, a retroreflector, or any other suitable reflective surface. The reflector 78 may transmit the image through the beam splitter 80 to generate a virtual image. As such, the virtual image may be generated on or near the vessel 18 positioned at a virtual image plane (e.g., geometric defined distance) in which the virtual image of the reflection from the reflector 78 is formed (e.g., location of the vessel 18). Further, the virtual image is the illusion as the image projected by the display 76 appears as the Pepper's Ghost effect on or near the vessel 18 positioned at the virtual image plane of the image transmitted by the reflector 78. In this manner, generation of the illusion (e.g., the special effect 22) by the special effects system 54 may provide the observer 14 with unobstructed views to the viewing are 20 to enhance immersive experiences.

FIG. 3-6 are examples of arrangements of the refreshments special effects system 12 or individual components thereof. It should be understood that the disclosed embodiments may include all or some of the disclosed the refreshments special effects system 12 of FIG. 2.

Figure 3:
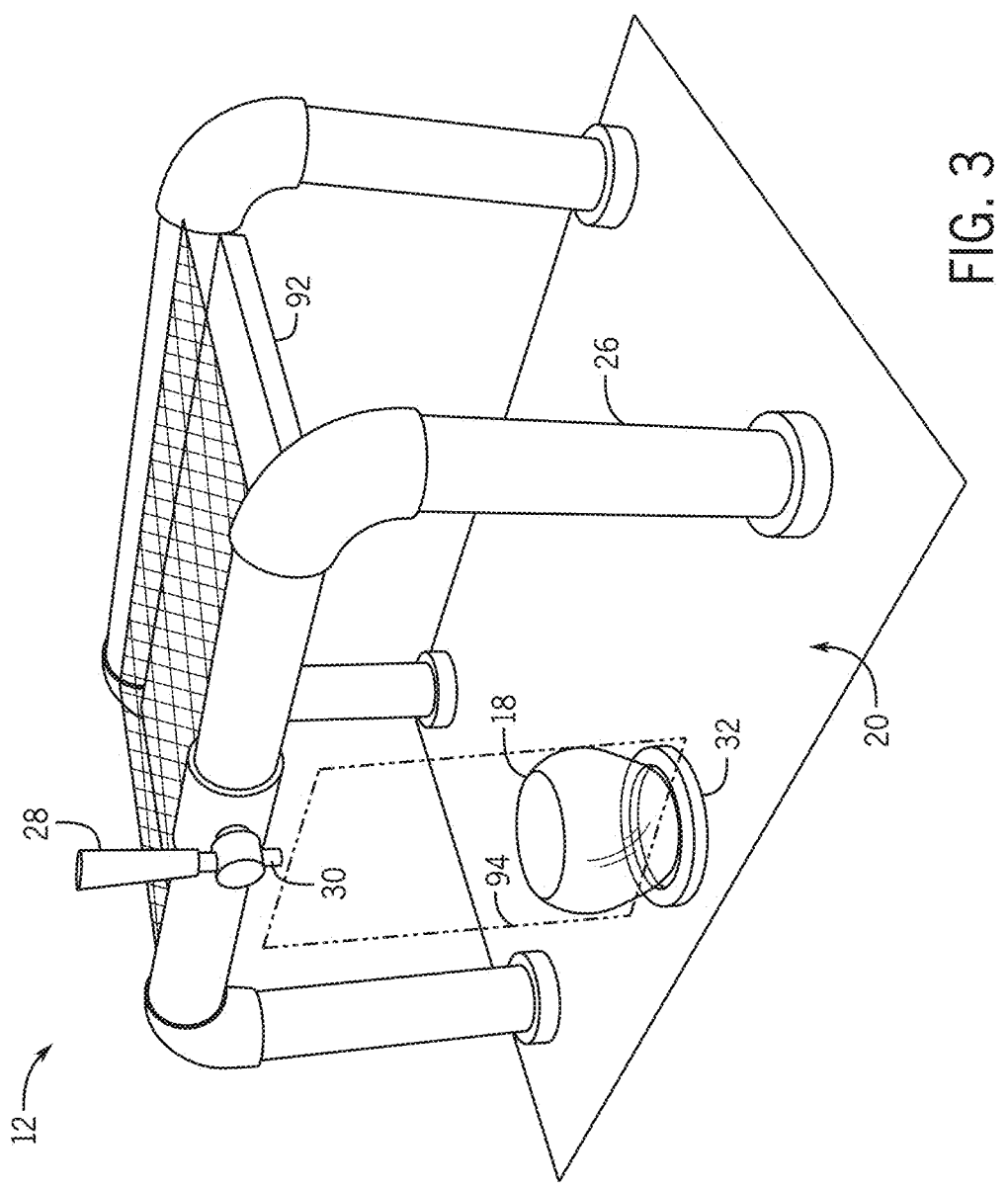
FIG. 3 is a schematic illustration of a vessel interacting with the refreshments special effects system, in accordance with embodiments described herein.

FIG. 3 is a schematic illustration of the refreshments special effects system 12. In certain embodiments, the refreshments special effects system 12 includes the special effects housing 26, the tap handle 28, the outlet 30 (e.g., spout, dispenser), and/or the base 32. The vessel 18 may be positioned on the base 32 sustainably parallel to the outlet 30. In this manner, special effects 22 may be projected into the vessel 18 after being formed in an area 92 of the special effects housing 26 out of view of the observer 14. Further, at least portions of the control system 52 and the special effects system 54 of FIG. 2 may be disposed in the area 92 of the special effects housing 26. As such, the special effects 22 generated by the special effects system 54 may appear to the observer 14 to be generated in a fantastical or magical manner.

In some embodiments, the vessel 18 is located on the base 32 in a plane 94 that aligns with a location of the outlet 30 of the special effects housing 26. As such, the special effects 22 may be generated to project from the outlet 30 following the plane 94 generating the virtual image of the refreshment effect on the vessel 18 when located on the base 32. For example, imagery of illusions including portrayal of a character may be generated by the special effects system 54 and transmitted through the outlet 30 to create the illusion of the character being on or within the vessel 18. As such, the observer 14 may observe the illusion of the character in the viewing area 20 as the virtual image is formed on or near the vessel 18.

In some embodiments, the special effects housing 26 may include a refreshments system that may provide physical refreshments to the vessel 18 in conjunction to the illusions produced by the special effects system 54. Further, the refreshments system may be housed in the special effects housing 26 and may provide liquids through the outlet 30 and/or an additional outlet to fill the vessel 18 before, during and/or after generation of the special effects 22. For example, the observer 14 may actively view the illusion of the character being generated on or near the vessel 18 followed by the pouring of a liquid (e.g., physical liquid such as beer) erasing (e.g., communicating with the special effects system 54 to end projection of images) the illusion of the character to generate an immersive experience combining virtual and physical effects to enhance guest experiences. In this manner, the control system 52 of the refreshments special effects system 12 may facilitate communication between the special effects system 54 and the refreshments system.

Figure 4:
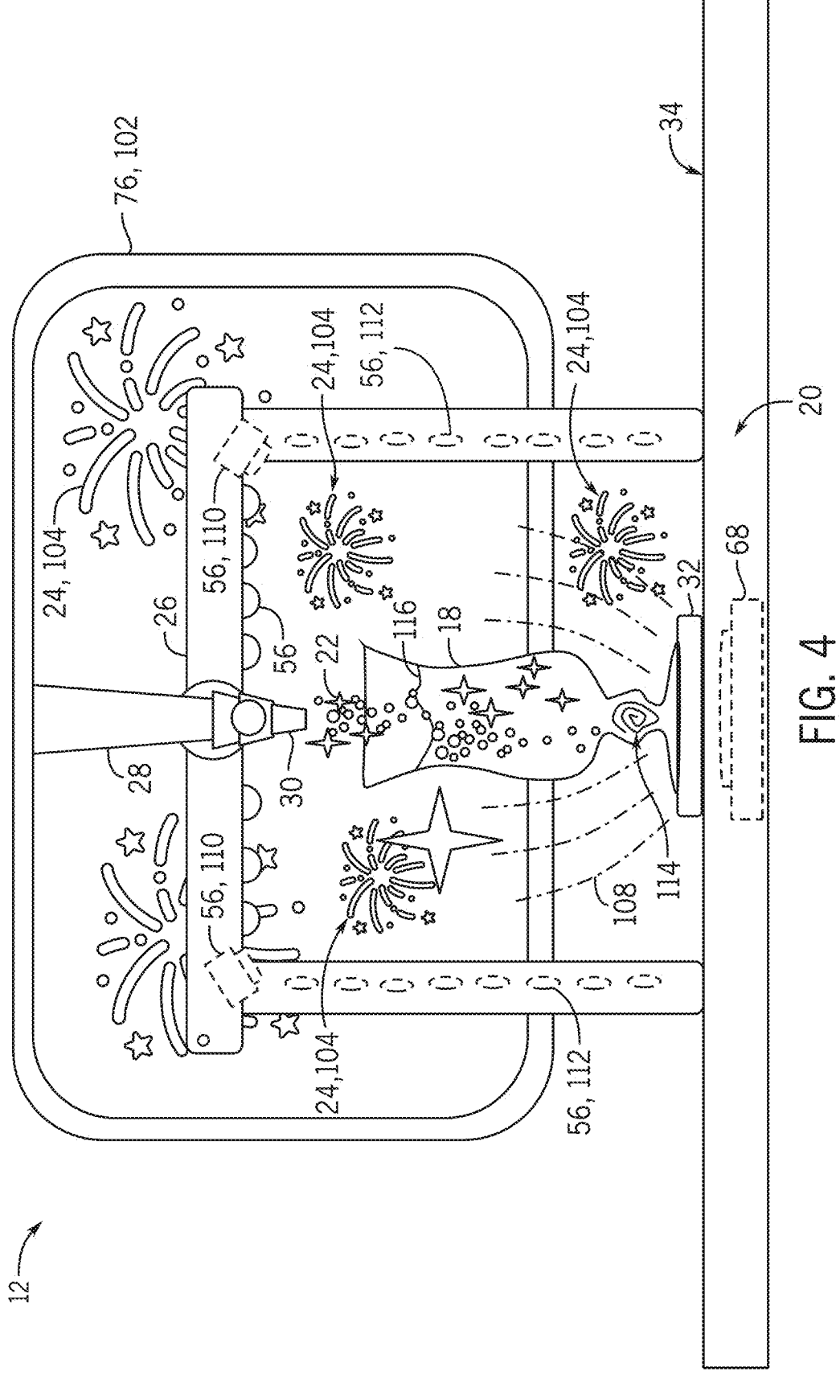
FIG. 4 is a schematic illustration of a vessel interacting with the refreshments special effects system, in accordance with embodiments described herein.

FIG. 4 is a schematic illustration of the refreshments special effects system 12 including generating special effects 22 on or near the vessel 18 positioned on the base 32 located on the surface 34 (e.g., bar). In some embodiments, additional special effects 24 may be generated surrounding (e.g., behind, in front, beside) the vessel 18. As such, the additional special effects 24 may include one or more auxiliary illusions 104, and/or one or more auxiliary displays 102 used by the special effects system 54 to enhance the special effects 22 generated on or around the vessel 18. Further, the additional special effects 24 may include one or more light sources 68. For example, the light source 68, 106 may be positioned within the surface 34 (e.g., bar) to illuminate the vessel 18. In this manner, the vessel 18 may be illuminated with a lighting effect 108 by the special effects system 54.

With the foregoing in mind, the special effects system 54 may be activated to project the special effects 22 and/or the additional special effects 24 based on sensor data. In this manner, one or more sensors 56 are used to monitor the viewing area 20. As such, the sensor provides sensor data related to the vessel 18 within the viewing area 20 that may include vessel localization data and/or vessel detection data. In certain embodiments, the sensors 56 are arranged on the special effects housing 26 out of view of the observer 14 (e.g., behind the viewing area 20). The sensors 56 may include one or more cameras 56, 110 that may be positioned above, diagonally, or in any other suitable position related to the vessel 18 allowing the cameras 56, 110 to monitor the presence and/or absence of the vessel 18 within the viewing area 20. In some embodiments, the sensors 56 may include an RFID tag 114 that may be detected by an RFID reader within the base 32. Further, the sensors 56, 112 may also be arranged surrounding the vessel 18 to provide sensor data. It should be noted, that FIG. 4 demonstrates a particular embodiment of the refreshments special effects system 12 and that multiple configurations of sensors 56 may be suitable in order to detect the vessel 18.

In some embodiments, the sensors 56 transmit the sensor data to the processor 60 of the control system 52 to determine the presence and/or the location of the vessel 18 based on the sensor data. The sensor data may be indicative of extractable patterns and/or recognizable features of the vessels 18. In an embodiment, the control system 52 may determine the position and the identity of the vessel 18 based on the characteristics that include at least a size, a height, and/or the shape of the vessel 18 as captured by the sensors 56. In this manner, the refreshments special effects system 12 may directly use the sensor data to determine the position and/or the identity of the vessel 18 and transmit the signal to activate the special effect system 54. For example, the sensor 56 may directly detect an identification marker positioned on the vessel 18 itself and provide sensor data to the control encoded with identification information of the vessel 18. In some instances, the identification marker may be the RFID tag 114 of the vessel 18. In other instances, the cameras 56, 110 may send sensor data including image detection or recognition to provide the control system 52 with information regarding the presence and/or the absence of the vessel 18. In some embodiments, the sensor data may determine that the vessel 18 is not located substantially parallel to the outlet 30 and may therefore provide notification to the staff member 16 that the vessel 18 may not be properly aligned for proper generation of the illusions.

In certain embodiments, activating the additional special effects 24 may include generation one or more additional images create the auxiliary illusions surrounding the vessel 18. As such the additional special effects 24 may be timed to visually match the special effects 22 on or near the vessel 18 (e.g., overlaid virtual imagery). In this manner, the special effects 22 of the vessel 18 may be tied into (e.g., match a theme, associated with a surrounding area) the environment 10. For example, if a firework effect is shown on the vessel 18 the additional special effects 24, 104 may be projected on the surface 34 (e.g., bar), special effects housing 26, and/or the displays 76, 102. In some instances, the additional special effects 24 and the special effects 22 may be simultaneously activated. As such, the vessel 18 may be illuminated by additional light sources 68 (e.g., such as LEDs, projection, or displays) as special effects 22 are generated (e.g., the firework effect) in and/or on the vessel 18. In this manner, the vessel 18 may also be illuminated by the light source 68 producing the lighting effect 108 and/or displays 76, 102 can be activated to further convey that the special effects 22 of the vessel 18 corresponds with the environment 10 to provide the observer 14 with immersive experiences (e.g., fireworks show). In some instances, the additional special effects 24 may include audio effects (e.g., sounds of fireworks) played on the speakers 72 or projected through the microphones 70 of the special effect system 54 to enhance guest experiences.

In some embodiments, the vessel 18 may react to the special effects 22. The vessel 18 may actuate (e.g., rock back and forth, fall over, and the like) to further enhance the special effects 22 to add to immersive experiences. For example, when the firework effect is generated the vessel 18 may rock back and forth to provide the observer 14 with enhanced illusions that the vessel 18 may be impacted by the special effect 22.

Figure 5:
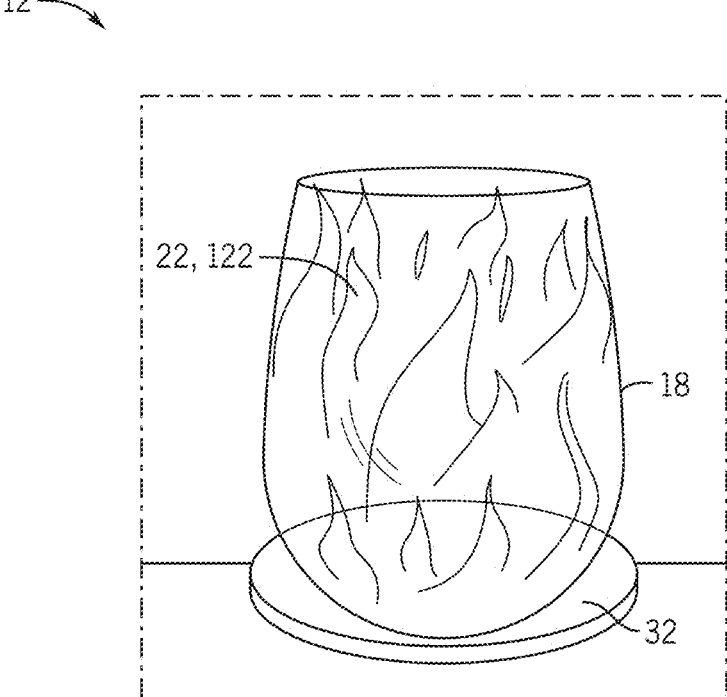
FIG. 5 is a schematic illustration of a vessel interacting with the refreshments special effects system, in accordance with embodiments described herein.

In certain embodiments, the sensors 56, 112 may provide sensor data to the control system 52 regarding a liquid level 116 of the vessel 18. For example, the sensors 56, 112 may track movement of the liquid (e.g., physical liquid) into the vessel 18 from the outlet 30 of the special effects system 54. The control system 52 may determine the liquid level 116 based on tracked movement of the liquid into the vessel 18 from the outlet 30 of the special effect system 54 (e.g., positioned on the special effects housing 26). For example, the outlet 30 may be coupled to a flow meter that estimates a volume of liquid/time entering the vessel over a time window when the outlet 30 is active or open. In an embodiment, the liquid level may be tracked using cameras that capture image data of the vessel 18 and identify changes in the image data indicative of liquid filling the vessel 18. As such, the special effects system 54 may control the image (e.g., generated to form the special effects 22) to dynamically match the liquid level 116 of the vessel 18. For example, as illustrated by FIG. 5, a schematic illustration of the refreshments special effects system 12, the special effects system 54 may generate a particular special effect such as a fire illusion 122 on or around the vessel 18 positioned on the base 32. As such, the fire illusion 22, 122 may be dynamically updated to match the liquid level 116 as provided by the control system 52 based on the sensor data.

In some embodiments, the refreshments special effects system 12 may include interaction of the vessel 18 or the staff member 16 may with the special effects 22 and/or additional special effects 24 to add to immersive effects of the environment 10. In some instances, the vessel 18 may not be positioned on the base 32 for the special effects 22 to activate. In this manner, the sensors 56 may actively track the position of the vessel 18. For example, a hand of the staff member 16 may be tracked by the sensors 56 in real time in order to properly position the special effects 22 on or around the vessel 18 while in the viewing area 20. As such, dynamic effects may be rendered in real time such as splashing of virtual liquid, fanning of flames that may respond to motion of the hand of the staff member 16 or the like. In this manner, the special effects 22 may appear to occur in a random fashion that may create realistic portrayal of bartenders preparing refreshments.

Figure 6:
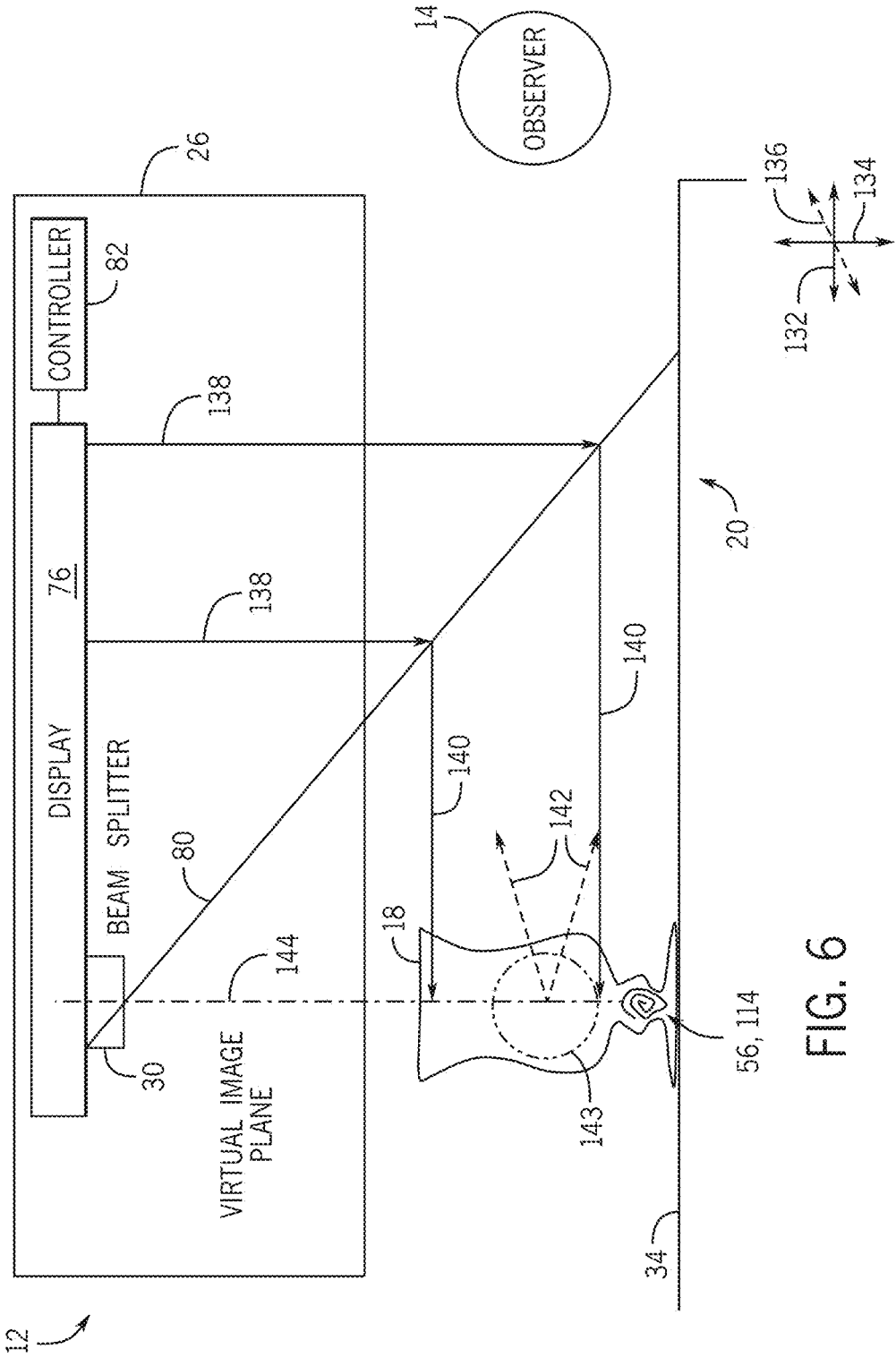
FIG. 6 is a schematic illustration of a vessel interacting with the refreshments special effects system, in accordance with embodiments described herein.

FIG. 6 is a schematic illustration of the vessel 18 interacting with the refreshments special effects system 12. In certain embodiments, the generation of the special effects 22 (e.g., refreshment effect) may be achieved using a Pepper's Ghost effect. To aid the discussion, a set of axes will be referenced. For example, a 3-D axis may include x-axis 132, a y-axis 134 and a z-axis 136. The x-axis 132 may run along the surface 34 (e.g., bar). The y-axis 134 may run from the top of the special effects housing 26 to the vessel 18. The z-axis 136 may run from the vessel 18 through the viewing area 20 to the observer 14.

In some embodiments, the beam splitter 80 is used to generate imagery to generate the illusions (e.g., special effects 22) on or near the vessel 18. In this manner, the special effects system 54 is activated by the control system 52 based on sensor data to generate the special effects 22. The controller 82 activates the display 76 to produce the image 138 on to the beam splitter 80. The image 138 is then reflected off of the beam splitter 80 and a reflected image 140 is transmitted through the beam splitter 80. The reflected image 140 generates an illusion 142 at a virtual image plane 144 having an illusion center or focal point 143, from the perspective of the observer 14, generated centered on or in the vessel 18. As such, the observer 14 may view the illusion 142 along the z-axis 136 and may not have an obstructed view. It should be noted, that in some embodiments the controller 82, display 76 and beam splitter 80 may be housed partially, fully, or outside of the special effects housing 26.

In some embodiments, the display 76 may include a particular type of display that may allow for multi-angle viewing including a lenticular display, a 3-D display, a light field display and the like. The particular type of display may allow the observer 14 to view the illusion 142 from multiple viewing angles within the viewing area 20. As such, the lenticular display may allow for perspective viewing of the illusion 142 providing illusions that appear to the observer 14 as 3-D and that may fill a volume of the vessel 18 with precision (e.g., filling a volume of the vessel 18). Additionally, a 2-D display may be used to generate the illusion 142. As such, it may be advantageous to mount multiple 2-D displays within the special effects housing 26 at various depths (e.g., along the y-axis 134). In this manner, depth control of the illusion 142 may be achieved through combination of multiple images and reflected images. Further, the illusion 142 may be formed from the multiple 2-D displays to appear 3-D to the observer 14. In some instances, combinations of 2-D displays and 3-D displays may be used to generate realistic illusions.

In certain embodiments, the outlet 30 of the special effects system 54 may include a transparent display or a persistence of viewing display. The transparent display or the persistence of viewing display may be positioned within the outlet 30 directed towards the vessel 18. As such, the outlet 30 may be covered in a transparent glass to allow the transparent display or the persistence of viewing display to directly project illusions on the vessel 18 while being at least partially hidden from the observer 14. In this manner, the illusion 142 generated by the transparent display or the persistence of viewing display may appear magical as the outlet 30 obfuscates the transparent display or the persistence of viewing display from the observer 14.

Figure 7:
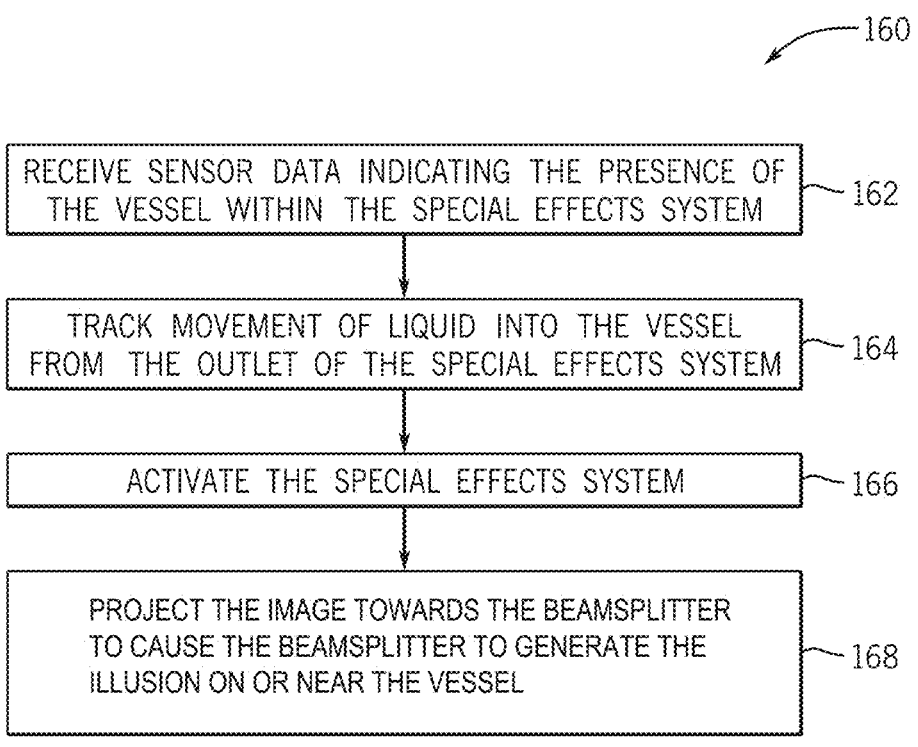
FIG. 7 is a flow diagram of a method to control a refreshments special effects system, in accordance with embodiments described herein.

FIG. 7 is a process flow diagram illustrating an embodiment of a method 160 of operating the refreshments special effects system 12 (see FIG. 1) and with reference to certain features of FIGS. 1-6. Steps of the method 160 may be performed by elements of the special effects system 12 as discussed herein. The method 160 includes at block 162 the control system 52 (see FIG. 2) receiving sensor data indicative of the presence of the vessel 18 within the viewing area 20 (see FIG. 1) of the special effects system 54 (see FIG. 2). At block 164 the sensors 56 (see FIG. 2) track movement of liquid into the vessel 18 (see FIG. 1) from the outlet 30 (see FIG. 1) of the special effects system 54 (see FIG. 2). Further, at block 166 the special effects system 54 is activated to generate the special effect 22 (see FIG. 1) and/or the additional special effect 24 (see FIG. 1) based on the sensor data. At block 168, the special effects system 54 (see FIG. 2) projects the image towards the beam splitter 80 (see FIG. 2) and causes the beam splitter 80 to generate the illusion by transmitting the image through the beam splitter 80 to the virtual image plane in line with the vessel 18. The image may be the image from the display 76 (see FIG. 2) or reflected from the reflector 76. As such, the illusion is generated on or near the vessel 18 (see FIG. 1). In some embodiments, the control system 52 uses the sensor data to select the special effects 22 associated with the vessel 18 detected by the sensors 56 and/or the liquid level of the vessel 18 as determined by the control system 52. As such the special effects 22 generates imagery on or near the object to enhance guests experiences in the food and beverage venue.

While only certain features of the disclosed technology have been illustrated and described herein, many modifications and changes will occur to those skilled in the art. It is, therefore, to be understood that the appended claims are intended to cover all such modifications and changes as fall within the true spirit of the disclosure. Furthermore, although the steps of the disclosed flowchart/s are shown in a given order, in certain embodiments, the depicted steps may be reordered, altered, deleted, and/or occur simultaneously.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A refreshments special effects system, comprising:
a special effects system comprising:
   one or more displays configured to generate an image in a viewing area; and
   a beam splitter positioned above a vessel and between the one or more displays and the vessel, wherein the beam splitter is configured to receive the image to generate an illusion from above the viewing area and project the generated illusion on or around the vessel, wherein the vessel is configured to hold a food or beverage item and wherein the vessel is at least partially transparent to visible light; and
a control system, wherein the control system comprises:
   one or more sensors configured to monitor the viewing area, wherein the one or more sensors are configured to provide sensor data related to the vessel in the viewing area; and
   a processor configured to activate the special effects system based on the sensor data.

2. The refreshments special effects system of claim 1, wherein the one or more displays are not visible to an observer in the viewing area.

3. The refreshments special effects system of claim 1, wherein the beam splitter is positioned between the vessel and a reflector.

4. The refreshments special effects system of claim 3, wherein the beam splitter forms an acute angle with the reflector.

5. The refreshments special effects system of claim 1, wherein the one or more displays comprises a lenticular display configured to provide a plurality of viewing angles of the illusion to one or more observers.

6. The refreshments special effects system of claim 1, wherein the one or more displays comprises one or more two-dimensional pixel display.

7. The refreshments special effects system of claim 1, wherein the one or more displays comprises a light field display.

8. The refreshments special effects system of claim 1, wherein the one or more displays comprises a persistence of vision display.

9. The refreshments special effects system of claim 1, wherein the one or more displays comprises a projector.

10. The refreshments special effects system of claim 1, wherein the vessel is supported by a base within the viewing area, wherein the viewing area is configured to provide an unobstructed view of the illusion to one or more observers.

11. A method comprising:
receiving sensor data indicative of a presence of a vessel in a special effects system, wherein the vessel is configured to hold a food or beverage item and wherein the vessel is at least partially transparent to visible light;
tracking movement of a liquid into the vessel from an outlet of the special effects system based on an amount of liquid poured into the vessel; and
activating the special effects system to project an image responsive to receiving the sensor data and tracking the movement, wherein the projected image is dynamically changed based on the tracked movement of the amount of liquid poured into the vessel, and wherein the image is projected towards a beam splitter positioned between a reflector and the vessel, wherein the beam splitter is configured to receive the image from one or more displays and reflect the image toward the reflector, the reflector being configured to reflect the image back toward and through the beam splitter to generate an illusion on or around the vessel.

12. The method of claim 11, comprising:
determining a liquid level indicative of a real-time change of the amount of liquid poured into the vessel based on tracked movement of the liquid into the vessel from the outlet of the special effect system;
controlling, via the special effects system, the image to dynamically match the liquid level of the vessel; and
generating the illusion on the vessel as the liquid level changes.

13. The method of claim 11, comprising:
activating one or more additional images to generate one or more additional illusions surrounding the vessel.

14. The method of claim 11, wherein the reflector is a retroreflector.

15. The method of claim 11, wherein the sensor data comprises vessel localization data and/or vessel detection data.

16. A refreshments special effects system, comprising:
a vessel configured to hold a food or beverage item, wherein the vessel is at least partially transparent to visible light;
a special effects system comprising one or more displays configured to generate a three-dimensional illusion on or around the vessel, wherein the vessel is positioned between a viewing area of the three-dimensional illusion and the one or more displays; and
a control system, wherein the control system comprises:
   one or more sensors configured to sense one or both of a presence or position of the vessel relative to the one or more displays and track movement of a liquid into the vessel from an outlet of the special effects system and generate sensor data based on the presence or position of the vessel and an amount of liquid poured into the vessel; and
   a processor configured to activate the special effects system to project an image responsive to receiving the sensor data and tracking the movement, wherein the projected image is dynamically changed based on the tracked movement of the amount of liquid poured into the vessel.

17. The refreshments special effects system of claim 16, wherein the vessel comprises an RFID tag that generates at least a portion of the sensor data.

18. The refreshments special effects system of claim 16, wherein the three-dimensional illusion on or around the vessel is a Pepper's Ghost effect.

19. The refreshments special effects system of claim 16, wherein the one or more displays are arranged out of a virtual image plane and wherein the images are reflected into the vessel.

20. The refreshments special effects system of claim 16, wherein the one or more sensors generate data indicative of a liquid level based on a real-time change of the amount of liquid poured in the vessel, wherein the processor is configured to change the three-dimensional illusion to match a change in the liquid level.

\* \* \* \* \*